United States Patent
Herz (10) Patent No.: US 10,430,070 B2
(45) Date of Patent: Oct. 1, 2019

(54) PROVIDING DEFINED ICONS ON A GRAPHICAL USER INTERFACE OF A NAVIGATION SYSTEM

(71) Applicant: SAP SE, Walldorf (DE)

(72) Inventor: Andreas Herz, Neckarhausen (DE)

(73) Assignee: SAP SE, Walldorf (DE)

( * ) Notice: Subject to any disclaimer, the term of this patent is extended or adjusted under 35 U.S.C. 154(b) by 417 days.

(21) Appl. No.: 14/798,426

(22) Filed: Jul. 13, 2015

(65) Prior Publication Data

US 2017/0017374 A1 Jan. 19, 2017

(51) Int. Cl.
| | | |
|---|---|---|
| G06F 3/048 | (2013.01) | |
| G06F 3/0488 | (2013.01) | |
| G06F 3/0482 | (2013.01) | |
| G01C 21/34 | (2006.01) | |
| G01C 21/36 | (2006.01) | |
| G06F 3/0486 | (2013.01) | |
| G06Q 10/10 | (2012.01) | |
| G06Q 30/02 | (2012.01) | |
| G06Q 50/28 | (2012.01) | |
| G06Q 50/30 | (2012.01) | |

(52) U.S. Cl.
CPC ..... *G06F 3/04883* (2013.01); *G01C 21/3438* (2013.01); *G01C 21/3617* (2013.01); *G01C 21/3664* (2013.01); *G06F 3/0482* (2013.01); *G06F 3/0486* (2013.01); *G06Q 10/101* (2013.01); *G06Q 30/0241* (2013.01); *G06Q 50/28* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 8,145,416 B2 * | 3/2012 | Wailes | G01C 21/343 701/533 |
| 8,285,570 B2 | 10/2012 | Meyer et al. | |
| 2004/0054428 A1 * | 3/2004 | Sheha | G01C 21/3664 700/56 |
| 2008/0147311 A1 * | 6/2008 | Zoller | G01C 21/3682 701/533 |
| 2008/0195428 A1 | 8/2008 | O'Sullivan | |
| 2009/0113330 A1 * | 4/2009 | Garrison | G06F 3/0486 715/769 |
| 2009/0177385 A1 * | 7/2009 | Matas | G01C 21/3614 701/533 |

(Continued)

OTHER PUBLICATIONS

Waze; How to navigate; Accessed on Feb. 6, 2015; Waze Mobile; Mountain View, CA, USA; (https://wiki.waze.com/wiki/How_to_Navigate#Pick_Up_a_friend_on_Waze).

*Primary Examiner* — Kevin L Young
*Assistant Examiner* — Haimei Jiang
(74) *Attorney, Agent, or Firm* — Buckley, Maschoff & Talwalkar LLC (57) ABSTRACT

Various embodiments of systems and methods to provide pre-defined navigation locations in a navigation system are described herein. In one aspect, a list of pre-defined location icons is provided on a graphical user interface. Further, the GUI enables to select at least two pre-defined location icons from the list of pre-defined location icons and driving information between locations is rendered corresponding to the selected at least two pre-defined location icons.

20 Claims, 8 Drawing Sheets

(56) References Cited

U.S. PATENT DOCUMENTS

| | | | |
|---|---|---|---|
| 2010/0175001 A1* | 7/2010 | Lazarus | G06Q 10/109 715/753 |
| 2010/0179750 A1* | 7/2010 | Gum | G01C 21/362 701/533 |
| 2010/0228477 A1* | 9/2010 | Sakashita | G01C 21/32 701/533 |
| 2010/0251177 A1* | 9/2010 | Geppert | G06F 3/04817 715/821 |
| 2010/0262928 A1* | 10/2010 | Abbott | G06F 3/04817 715/769 |
| 2011/0099040 A1 | 4/2011 | Felt et al. | |
| 2011/0145089 A1 | 6/2011 | Khunger et al. | |
| 2011/0153629 A1 | 6/2011 | Lehmann et al. | |
| 2011/0246404 A1 | 10/2011 | Lehmann et al. | |
| 2011/0313880 A1 | 12/2011 | Paul et al. | |
| 2012/0041675 A1 | 2/2012 | Juliver et al. | |
| 2012/0290652 A1 | 11/2012 | Boskovic | |
| 2013/0024818 A1* | 1/2013 | Rainisto | G06F 3/0482 715/838 |
| 2014/0047346 A1 | 2/2014 | Karamchedu | |
| 2014/0047354 A1 | 2/2014 | Karamchedu | |
| 2014/0067488 A1 | 3/2014 | James et al. | |
| 2014/0180746 A1 | 6/2014 | Lehmann et al. | |
| 2014/0180764 A1* | 6/2014 | Lehmann | G06Q 30/0203 705/7.32 |
| 2014/0188775 A1 | 7/2014 | Lehmann et al. | |
| 2014/0214507 A1* | 7/2014 | Estes | G06Q 30/0214 705/14.16 |
| 2014/0244170 A1 | 8/2014 | Lerenc | |
| 2014/0309870 A1* | 10/2014 | Ricci | H04W 4/21 701/36 |
| 2015/0077653 A1* | 3/2015 | Manan | G09F 23/0058 349/12 |
| 2015/0153933 A1* | 6/2015 | Filip | G06F 16/58 715/838 |
| 2016/0132205 A1* | 5/2016 | Ramakrishnan | G06F 3/0488 715/765 |
| 2016/0132792 A1* | 5/2016 | Rosnow | G06Q 10/02 705/5 |

\* cited by examiner

PROVIDING DEFINED ICONS ON A GRAPHICAL USER INTERFACE OF A NAVIGATION SYSTEM

FIELD

Embodiments generally relate to navigation systems, and more particularly to methods and systems to provide a graphical user interface enabling selection of pre-defined navigation locations.

BACKGROUND

In a transportation system, one of the widely used systems is navigation system. Typical navigation system requires inputting two points of interest, i.e., a source location and a destination location. Upon receiving such information, fastest and/or shortest routes are displayed.

One of the challenges in the navigation system may be better user experience. Accordingly, there are different ways to input the source location and the destination location such as directly inputting address of the locations, inputting a point of interest place name of the destination, selecting the place name of the destination from a list of possible displayed "place names" based on the input of the point of interest place type (e.g., food joint) of the destination, selecting the name of the destination from among the names of the most recent "n" number of destinations, inputting a point of interest telephone number of the destination, or the like. In inputting the addresses of the locations, a user may have to type the location name or address or location related information or select from the provided list to provide input to the navigation system.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to provide a graphical user interface enabling selection of pre-defined navigation locations are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
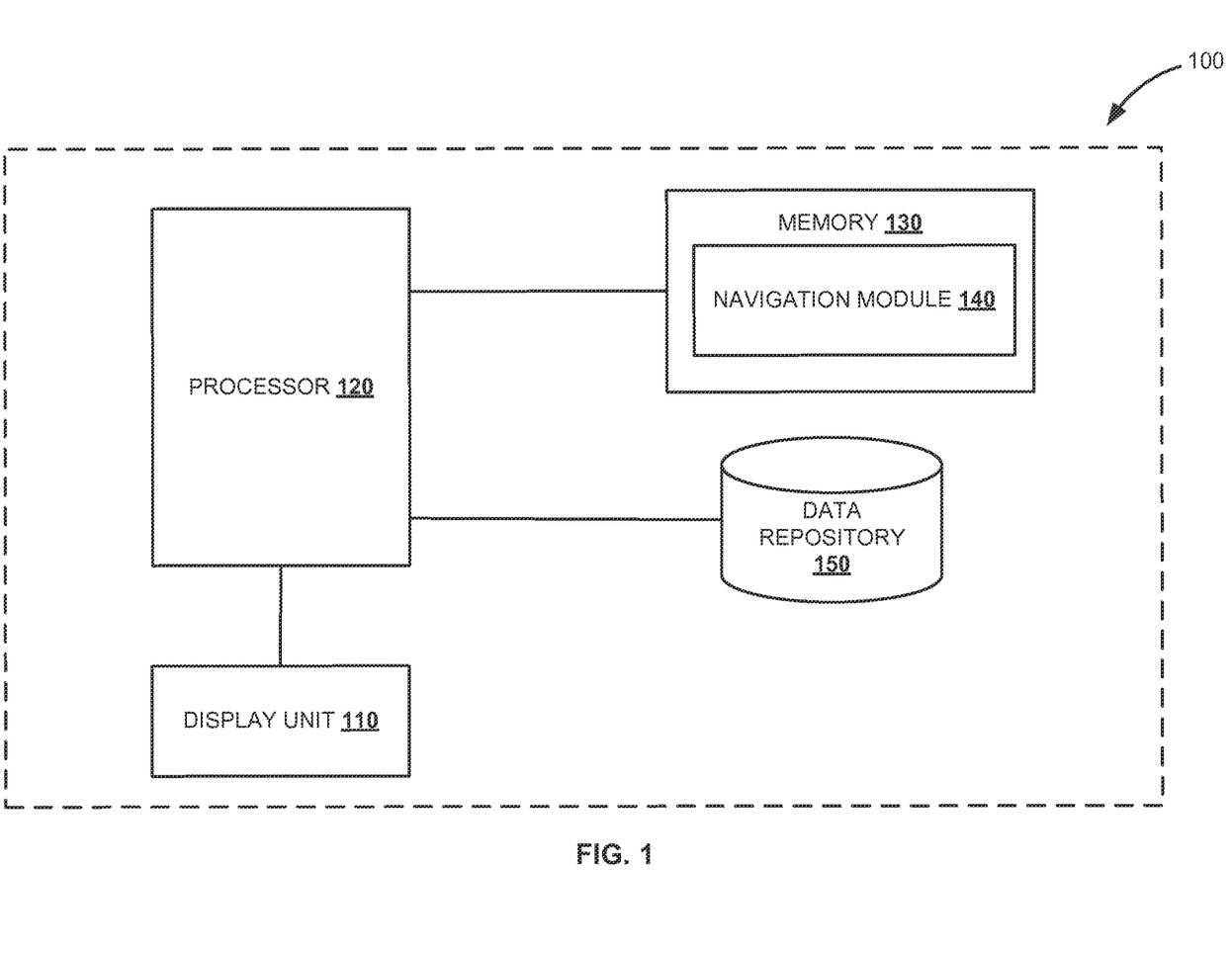
FIG. 1 is a block diagram of a computing environment illustrating a special purpose computing system configured to provide a graphical user interface that enables selection of pre-defined navigation locations, according to an embodiment.

FIG. 1 is a block diagram of a computing environment illustrating special purpose computing system 100 configured to provide a graphical user interface that enables selection of pre-defined navigation locations, according to an embodiment. The computing system 100 includes a memory 130 and a processor 120 to execute instructions stored in the memory 130. The computing system 100 can be, but limited to modern portable consumer and industrial electronics, especially user devices such as navigation systems, smart phones, portable digital assistants, and combination devices and other handheld device or handheld computer system.

The processor 120 or "CPU" is in electronic communication with a non-transitory computer-readable storage medium (e.g., memory 130) through a high speed memory bus, for instance. In one exemplary embodiment, the computer-readable storage medium is stored thereon code corresponding to an interface engine and a database engine. Further, the code may be configured to reference data stored in a database of the non-transitory computer-readable storage medium, for example as may be present locally or in a remote database server. Software servers together may form a cluster or logical network of computer systems programmed with software programs that communicate with each other and work together in order to process requests. In one exemplary embodiment, the processor 120 may reside in the computing system 100. In another exemplary embodiment, the processor 120 may reside in other remote computing system.

The processor 120 executes the instructions stored in the memory 130 by accessing relevant data stored in data repository 150. In one embodiment, the memory 130 includes navigation module 140, which can be a module of computer program instructions to provide a graphical user interface (GUI) that enables selection of pre-defined navigation locations. Further, the GUI can be rendered through display unit 110.

The navigation module 140 may, depending upon the implementation, be part of a user device, an application, another application, a module of the server or another computer system. Additionally, it should be understood that the navigation module 140 can be implemented on another device rather than on the user device. For example, the navigation module 140 can be implemented on the user device such as a personal computer, tablet, cell phone or other mobile device, to provide the GUI enabling selection of pre-defined navigation locations and then performs the various processes described below for generating and displaying the GUI. The GUI provides an interface for a user to interact with the processor 120 with touch input and/or miniature keyboard. The behavior of the GUI may be governed by computer executable instructions that are executed when the user interacts with the GUI.

In one embodiment, the GUI is enabled to include a plurality of selectable location icons. Further, the GUI provides an option to the user to define selectable location icons with addresses of the point of interest locations and label the icons accordingly. For example, a selectable icon is defined with address of home and labelled as "home." In one exemplary embodiment, the addresses corresponding to pre-defined location icons are stored in an in-memory computing repository (e.g., the data repository 150).

In real-time environment, the user initiates a process of selecting at least two pre-defined location icons for navigation information. For example, when two pre-defined location icons are selected by the user, driving information between locations associated with the pre-defined location icons is provided. In one example, the driving information provides a map or a route between locations corresponding to the pre-defined location icons. In another example, a shared drive ride (e.g., ride sharing applications such as carpooling and the like) is activated between the selected locations. In other words, an option to input details for a shared drive is provided and a shared navigation schedule is updated based on the details such as whether the user requires a driver or the user is the one who will be driving and wants to pool in other travelers between the selected locations. Therefore, addresses of a source location and a destination location can be easily selected without typing the addresses or selecting from a navigation menu.

Figure 2:
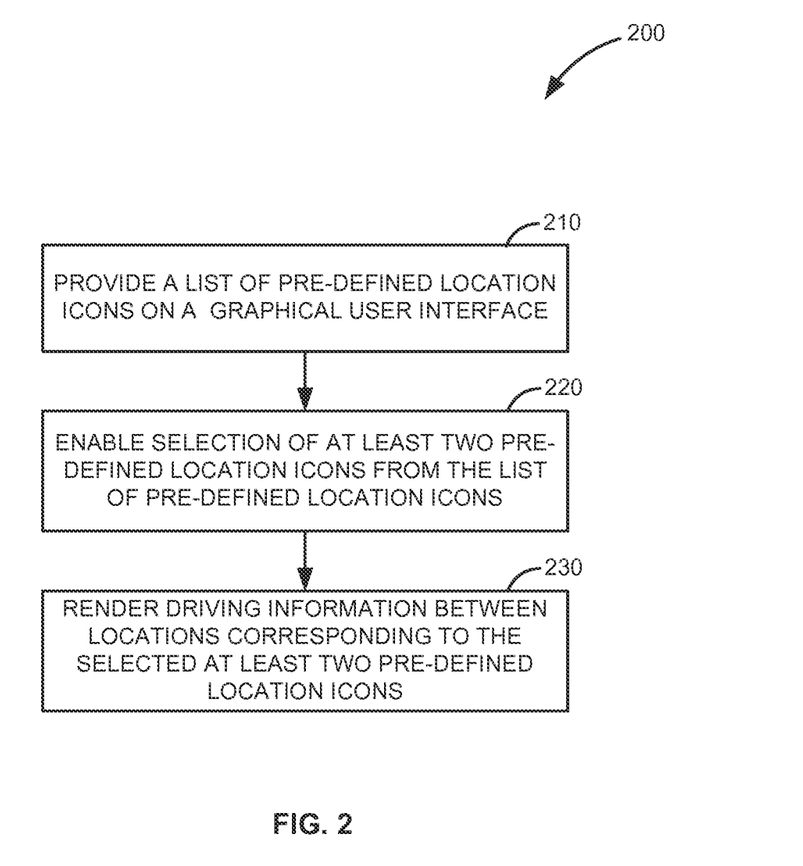
FIG. 2 is a flow diagram illustrating an example process to select pre-defined navigation locations, according to an embodiment.

FIG. 2 is a flow diagram illustrating example process 200 to select pre-defined navigation locations, according to an embodiment. At 210, a list of pre-defined location icons are provided on a computer generated graphical user interface (GUI). In one embodiment, providing the list of pre-defined location icons includes rendering a list of location icons on the graphical user interface and providing an option to define the location icons with location addresses associated with places of interest. In other words, the GUI may include a plurality of selectable location icons and the user can define the selectable location icons with addresses of locations as per user's interest. Thereby, the pre-defined location icons represent navigation locations and correspond to addresses associated with places of interest. For example, the user defines the location icons as "home", "office", "gym", "school", "tom" and the like, which are linked to respective addresses. Also, the GUI provides an option to modify addresses corresponding to the pre-defined location icons.

At 220, selection of at least two pre-defined location icons from the list of pre-defined location icons is enabled. In one exemplary embodiment, selecting the at least two pre-defined location icons includes swiping from a first pre-defined location icon to a second pre-defined location icon. For example, when the user desires to know driving information from "office" to "gym", the user can select a pre-defined location icon associated with "office", drag the selection from "office" to another pre-defined location icon associated with "gym" and release the selection at "gym." In another exemplary embodiment, selecting the at least two pre-defined location icons includes selecting the at least two pre-defined location icons by tapping the first pre-defined location icon and the second pre-defined location icon. It is appreciated that the actions performed to select the pre-defined location icons such as selecting, dragging, releasing and tapping are example ways of selecting the desired pre-defined location icons and other ways of selection can be implemented.

At 230, driving information between locations corresponding to the selected two or more pre-defined location icons is rendered. In one exemplary embodiment, rendering the driving information includes providing an option to input details for a shared drive (e.g., carpooling) and updating a shared navigation schedule based on the input. Thereby the shared drive can be activated.

In another exemplary embodiment, rendering the driving information includes displaying a route map between the locations corresponding to the selected at least two pre-defined location icons. Therefore, the described process simplifies the submission of routes by providing an easier and user friendly option to input desired locations (e.g., source location and destination location) via selected pre-defined location icons.

Figure 3A:
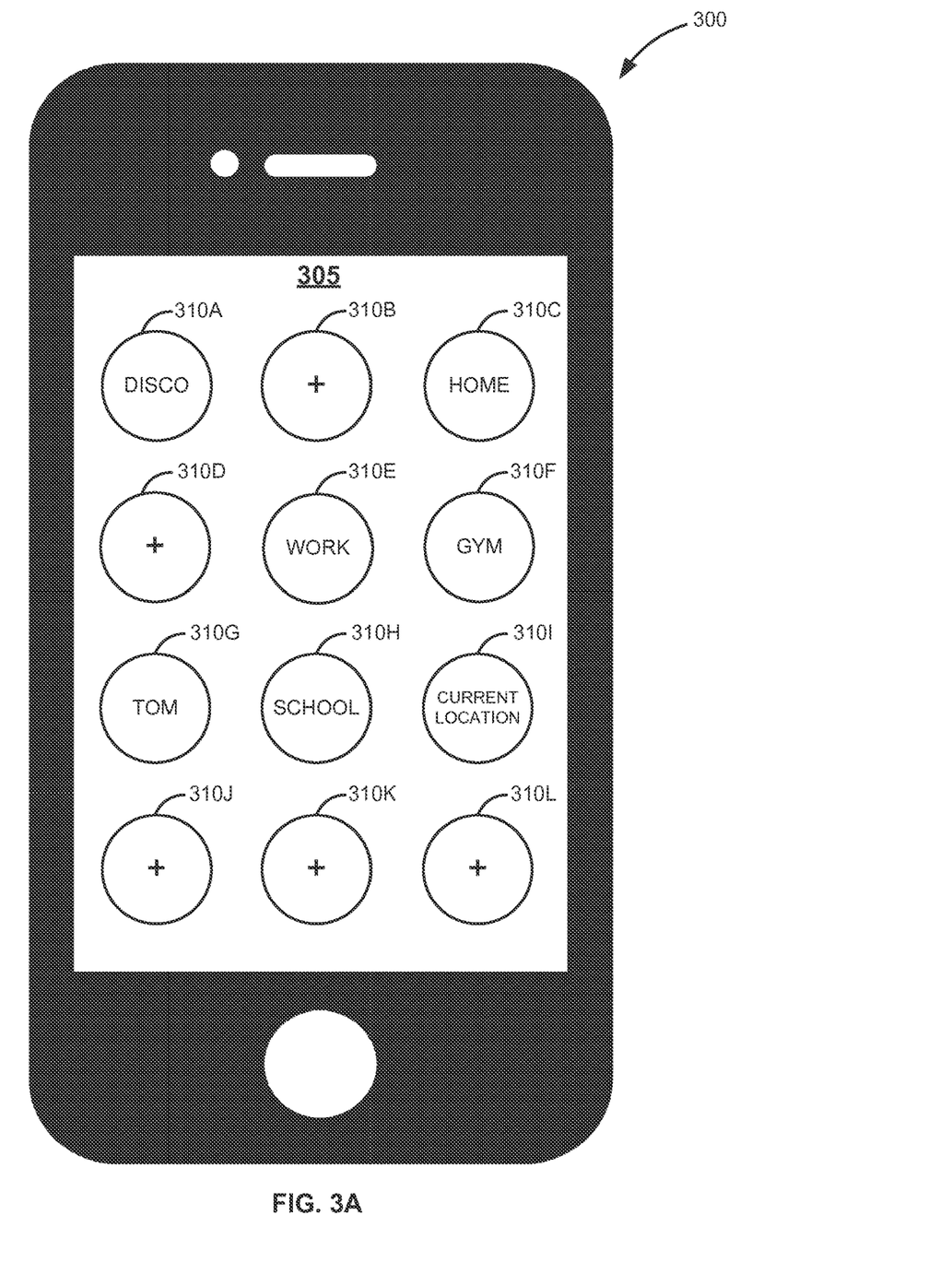
FIG. 3A is a schematic diagram illustrating an example graphical user interface of a device, according to an embodiment.

FIG. 3A is a schematic diagram illustrating example graphical user interface 305 of computing device 300, according to an embodiment. The computing device can be, but not limited to a personal computer, a tablet, a cell phone, a navigating device or other mobile device. The computing device 300 includes at least a keyboard and a display. The display can be a touch screen display. In one embodiment, the graphical user interface 305 is configured to include a plurality of selectable location icons (e.g., 310A to 310L). The selectable location icons can be of different shapes (e.g., square, circle, triangle, hand drawn picture, personalized photograph and the like) and different colors. In FIG. 3A, the location icons are in a shape of dots or circles. Further, an option is provided to define or associate each location icon (e.g., 310A to 310L) to address of a location, which is user's point of interest. Thus, the pre-defined location icons represent locations of user's point of interest. For example, the location icon 310A is associated with an address of a disco and labeled as "disco", where "disco" is a short cut name for the underlying address. The location icon 310C is associated with an address of home and labeled as "home." The location 310I is associated with address of device's current location. In the example, the current location of the device may be automatically identified and/or accessed by the navigating system. Similarly, other location icons are associated with different addresses based on the user's point of interest. In one embodiment, each of the defined location icons (e.g., 310A, 310C, 310E, 310F, 310G, 310H and 310I) can be disassociated with the defined address and can be associated with new address by an action of long press on the location icon, for instance.

Figure 3B:
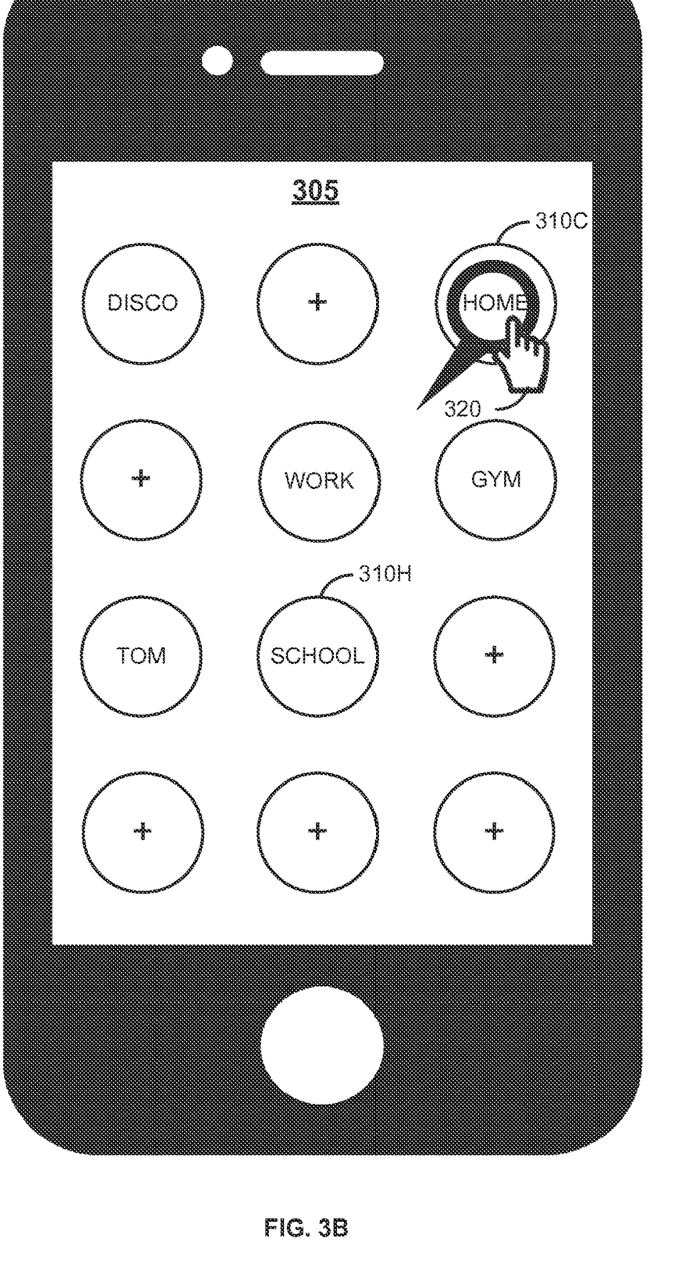
FIG. 3B is a schematic diagram illustrating an example graphical user interface enabling selection of a source location, according to an embodiment.

FIG. 3B is a schematic diagram illustrating the example graphical user interface (GUI) 305 enabling selection of a source location, according to an embodiment. The touch screen display of the computing device 300 is enabled to select at least two pre-defined location icons. For example, when a user desires for driving information from "home" to "school", the GUI enables the user to select a pre-defined location icon associated with "home" 310C. In the example, the user selects "home" by taping on the pre-defined location icon associated with "home" (e.g., 320).

Figure 3C:
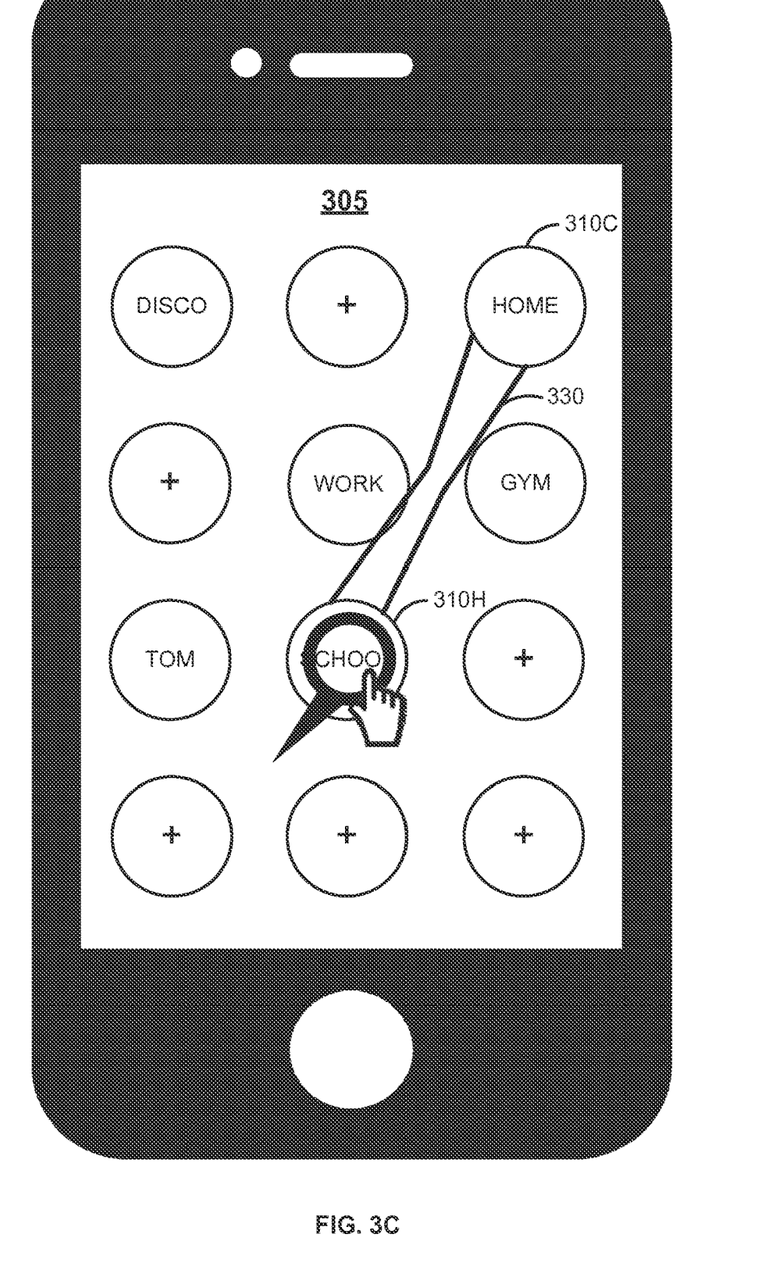
FIG. 3C is a schematic diagram illustrating an example graphical user interface enabling selection of at least two pre-defined location icons, according to an embodiment.

FIG. 3C is a schematic diagram illustrating example graphical user interface (GUI) 305 enabling selection of at least two pre-defined location icons, according to an embodiment. The GUI enables to select the at least two pre-defined location icons from the list of pre-defined location icons. In the example, when a user desires to know driving information from "home" and "school", the user can select a pre-defined location icon associated with "home" 310C as described in FIG. 3B and further drags the selection till a pre-defined location icon associated with "school" 310H (e.g., 330) as shown in FIG. 3C. In other words, the user can select a pre-defined location icon associated with "home" 310C and "school" 310H by swiping from "home" 310C to "school" 310H.

Figure 3D:
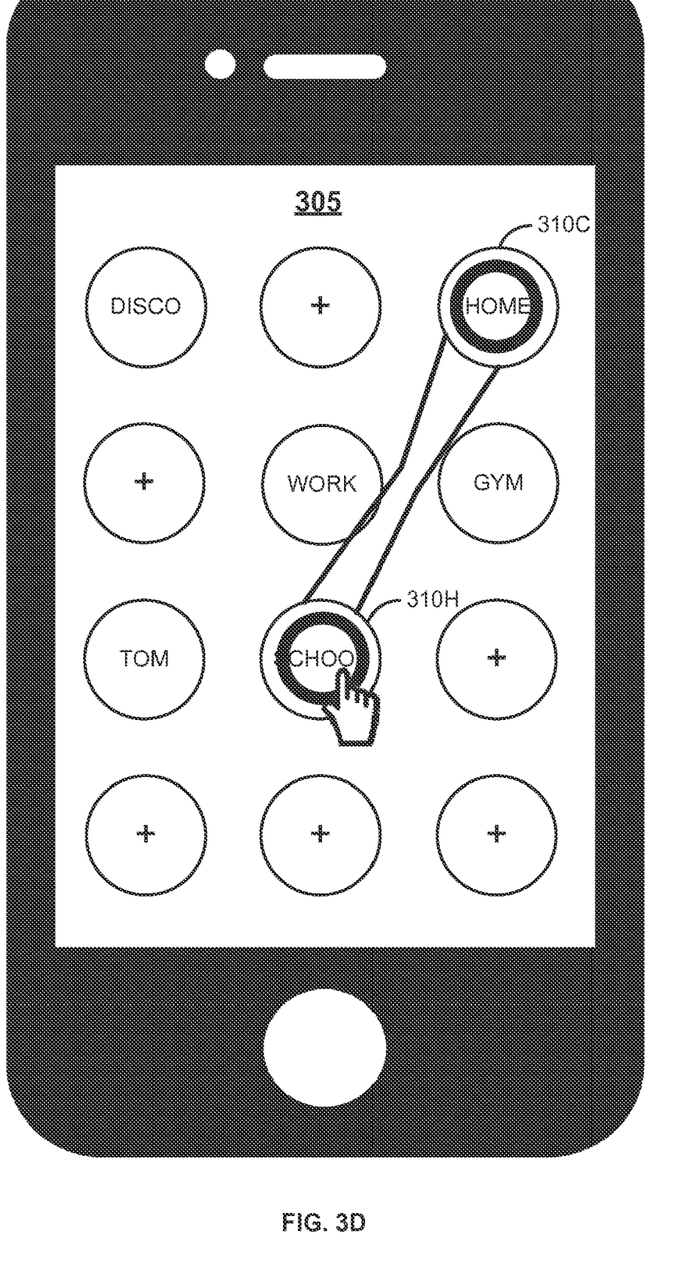
FIG. 3D is a schematic diagram illustrating an example graphical user interface depicting selected two pre-defined location icons, according to an embodiment.

FIG. 3D is a schematic diagram illustrating example graphical user interface (GUI) 305 depicting selected two pre-defined location icons, according to an embodiment. In the example, the pre-defined location icons associated with "home" 310C and "school" 310H are selected by tapping "home" 310C as described in FIG. 3B, dragged till "school" 310H as depicted FIG. 3C and further releasing the selection at "school" 310H as shown in FIG. 3D. Therefore, "home" 310C and "school" 310H are selected as points of interest of a user. In one exemplary embodiment, the selected pre-defined location icons can be visually highlighted by different patters or shapes, and colors. Thereby, location information can be easily fed as input with just one gesture (e.g., "drawing a line between the desired location by selecting, dragging and releasing) as described in FIG. 3B to 3D, instead of typing or navigating in different submenus. Even though the examples in FIGS. 3A-3D shows selecting at least two pre-defined location icons by swiping, any other ways for selecting the at least two pre-defined location icons, such as, but not limited to selecting the at least two pre-defined location icons by tapping, can also be used.

Figure 4:
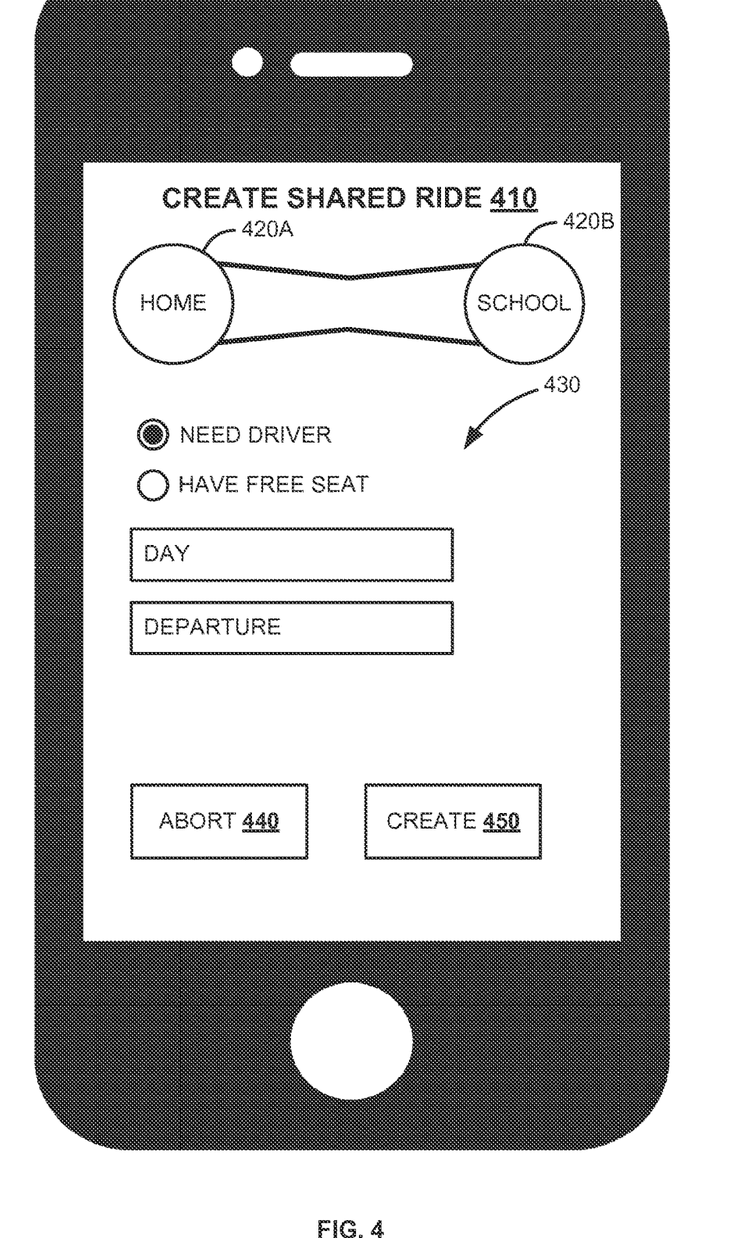
FIG. 4 is a schematic diagram illustrating an example graphical user interface rendering driving information, according to an embodiment.

FIG. 4 is a schematic diagram illustrating exemplary graphical user interface (GUI) rendering driving information, according to an embodiment. Upon inputting location information via pre-defined location icons, the driving information is displayed on the GUI. The driving information can be, but not limited to providing a map or route between the locations provided as input and providing an option to enter details related to shared drive (e.g., carpooling).

In one example, the driving information for the selected pre-defined location icons "home" 420A and "school" 430B is provided. The driving information can be a "create shared ride" 410. The "create shared ride" 410 further provides an option to input details related to shared drive such as, but not limited to whether a user need a driver or have a free seat, day of travel and departure time (e.g., 430). Further, the user can create (e.g., 450) a ride with the provided information or abort (e.g., 440) the ride, with no additional input for addresses of the desired locations.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
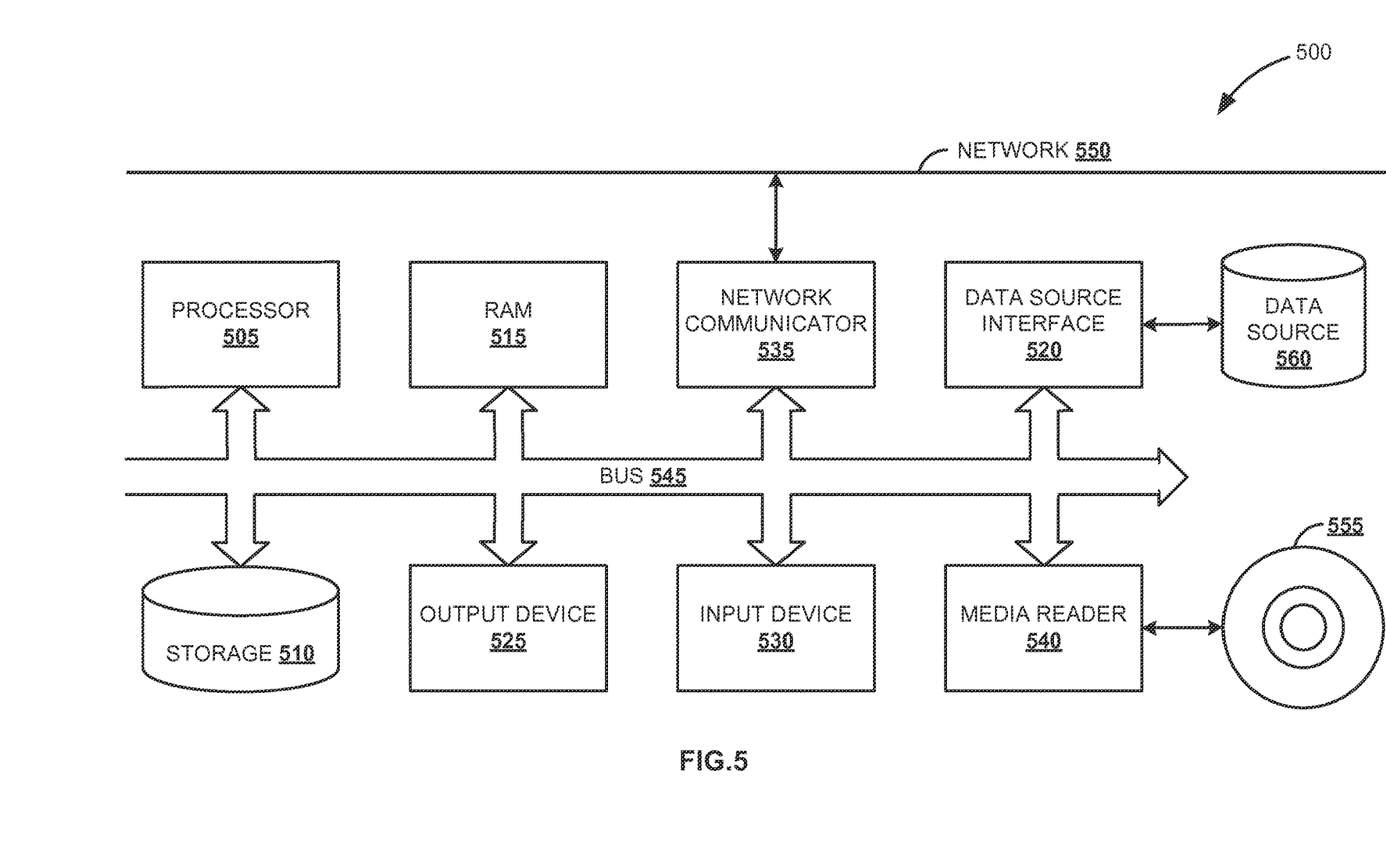
FIG. 5 is a block diagram of an exemplary computer system, according to an embodiment.

FIG. 5 is a block diagram of exemplary computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
  rendering a plurality of unlabeled icons at arbitrary locations on a graphical user interface associated with a navigation system;
  dynamically labeling the plurality of unlabeled icons rendered at arbitrary locations on the user interface with a plurality of address locations, respectively, to generate a plurality of address-labeled icons that are arranged on the graphical user interface without respect to geographic locations of the address locations represented by the plurality of address-labeled icons;
  detecting a selection of two address-labeled icons displayed via the graphical user interface; and
  displaying, via the user interface, driving information between corresponding address locations represented by the two address-labeled icons on the graphical user interface in response to detecting the selection of the two address-labeled icons.

2. The computer implemented method of claim 1, wherein the address locations corresponding to the two address-labeled icons are stored in an in-memory computing repository.

3. The computer implemented method of claim 1, wherein the detecting comprises detecting, via the user interface, one or more of swiping from a first address-labeled icon to a second address-labeled icon and tapping the first address-labeled icon and the second address-labeled icon.

4. The computer implemented method of claim 1, wherein the displaying the driving information comprises:
  displaying an input screen for receiving details for a shared drive; and
  updating a shared navigation schedule based on a received input via the input screen.

5. The computer implemented method of claim 1, wherein the displaying the driving information comprises displaying a route map between the address locations on a geographic map corresponding to the selected address-labeled icons.

6. The computer implemented method of claim 1, wherein the graphical user interface displays an option to modify the address locations corresponding to the plurality of address-labeled icons.

7. A computing system comprising:
  at least one processor; and
  one or more memory devices communicative with the at least one processor, wherein the one or more memory devices store instructions to:
    render a plurality of unlabeled icons at arbitrary locations on a graphical user interface associated with a navigation system;
    dynamically labeling the plurality of unlabeled icons rendered at arbitrary locations on the user interface with a plurality of address locations, respectively, to generate a plurality of address-labeled icons that are arranged on the graphical user interface without respect to geographic locations of the address locations represented by the plurality of address-labeled icons;
    detect a selection of two address-labeled icons displayed via the graphical user interface; and
    display, via the user interface, driving information between corresponding address locations represented by the two address-labeled icons on the graphical user interface in response to detecting the selection of the two address-labeled icons.

8. The computing system of claim 7, wherein the address locations corresponding to the two address-labeled icons are stored in an in-memory computing repository.

9. The computing system of claim 7, wherein the detecting, via the user interface, comprises detecting one or more of swiping from a first address-labeled icon to a second address-labeled icon and tapping the first address-labeled icon and the second address-labeled icon.

10. The computing system of claim 7, wherein the displaying the driving information comprises:
  displaying an input screen for receiving details for a shared drive; and
  updating a shared navigation schedule based on a received input via the input screen.

11. The computing system of claim 7, wherein the displaying the driving information comprises displaying a route map between the address locations corresponding to the selected two address-labeled icons.

12. A non-transitory computer readable storage medium storing instructions, which when executed by a processor cause a computer to perform a method comprising:
- rendering a plurality of unlabeled icons at arbitrary locations on a graphical user interface associated with a navigation system;
- dynamically labeling the plurality of unlabeled icons rendered at arbitrary locations on the user interface with a plurality of address locations, respectively, to generate a plurality of address-labeled icons that are arranged on the graphical user interface without respect to geographic locations of the address locations represented by the plurality of address-labeled icons;
- detecting a selection of two address-labeled icons displayed via the graphical user interface; and
- displaying, via the user interface, driving information between corresponding address locations represented by the two address-labeled icons on the graphical user interface in response to detecting the selection of the two address-labeled icons.

13. The non-transitory computer-readable medium of claim 12, wherein the plurality of address-labeled icons are labeled with location addresses associated with places of interest to a user.

14. The non-transitory computer-readable medium of claim 12, wherein the displaying the driving information comprises displaying a route map between the location addresses corresponding to the selected two address-labeled icons.

15. The non-transitory computer-readable medium of claim 12, wherein the displaying of the driving information comprises displaying an option to input details for a shared drive.

16. The non-transitory computer-readable medium of claim 12, wherein the selection of the two address-labeled icons comprises swiping from a first address-labeled icon to a second address-labeled icon.

17. The non-transitory computer-readable medium of claim 12, wherein the selection of the two address-labeled icons comprises tapping a first address-labeled icon and a second address-labeled icon.

18. The non-transitory computer-readable medium of claim 15, wherein the method further comprises displaying a modification to one or more of the location addresses corresponding to the selected two address-labeled icons based on receiving an input.

19. The computer implemented method of claim 1, wherein the plurality of address-labeled icons comprise user-generated descriptive labels that input via the user interface.

20. The computer implemented method of claim 1, wherein the plurality of unlabeled icons are arranged in an arbitrary pattern on the graphical user interface without reference to geographical locations.

* * * * *